Aug. 28, 1962 V. R. VORWERK ET AL 3,050,940
LIQUID PROPELLANT RELEASE MECHANISM
Filed Dec. 12, 1952 4 Sheets-Sheet 1
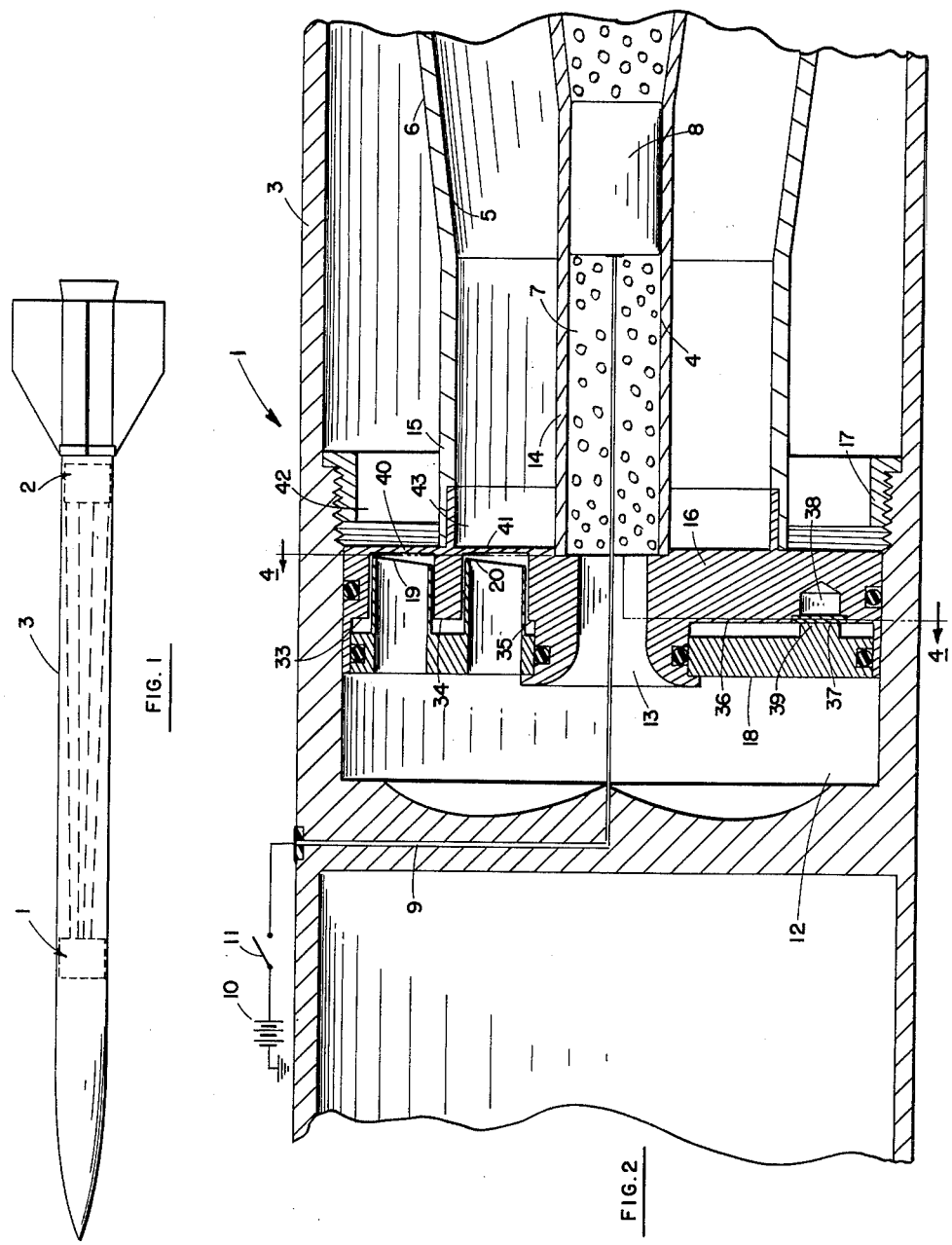
*INVENTORS*
VERNON R. VORWERK
ROLAND R. MORIN
BY
*William R. Lane*
ATTORNEY

INVENTORS
VERNON R. VORWERK
ROLAND R. MORIN

BY William R. Lane

ATTORNEY

Aug. 28, 1962 V. R. VORWERK ET AL 3,050,940
LIQUID PROPELLANT RELEASE MECHANISM
Filed Dec. 12, 1952 4 Sheets-Sheet 3

*INVENTORS*
VERNON R. VORWERK
ROLAND R. MORIN

BY William R. Lane

ATTORNEY

Aug. 28, 1962 V. R. VORWERK ET AL 3,050,940
LIQUID PROPELLANT RELEASE MECHANISM
Filed Dec. 12, 1952 4 Sheets-Sheet 4

*INVENTORS*
VERNON R. VORWERK
ROLAND R. MORIN
BY
*William R Lane*
ATTORNEY 3,050,940
LIQUID PROPELLANT RELEASE MECHANISM
Vernon R. Vorwerk, Los Angeles, and Roland R. Morin, Manhattan Beach, Calif., assignors to North American Aviation, Inc.
Filed Dec. 12, 1952, Ser. No. 325,576
7 Claims. (Cl. 60—39.14)

This device is a means for releasing propellants, and more particularly a positive means for releasing liquid propellants into the combustion chamber of a rocket.

It is customary to release liquid propellants into the combustion chamber of small air-to-air rockets by using burst diaphragms. A pneumatic pressure is customarily released against a burst diaphragm at one point in each propellant tank to cause the diaphragm to burst and force the liquid propellant against another burst diaphragm at the exit from the propellant tank, thereby releasing the propellants into the combustion chamber. The major difficulty heretofore has been that the diaphragms had to be designed to burst at an exact predetermined pressure. When two propellants—a fuel and an oxidizer—are used, the burst diaphragms may or may not burst at the same time, and propellants are wasted. This invention contemplates a mechanism for affirmatively cutting diaphragms which are placed at both ends of the propellant tanks to retain the liquid propellant when the rocket is not being operated, when a pneumatic pressure is introduced into a piston mechanism to cause the diaphragms to engage cutters or knives.

It is therefore an object of this invention to provide an improved means for releasing liquid propellant into the combustion chamber of a rocket.

It is another object of this invention to provide positive release means for releasing both an oxidizer and a fuel simultaneously into the combustion chamber of a rocket.

Other objects of invention will become apparent from the following description taken in connection with the accompanying drawings, in which—

FIG. 1 is a view of a typical rocket showing the position of the device of this invention;

FIG. 2 is a half-section view of a typical piston mechanism and pneumatic pressure-introducing device of this invention, indicated generally at 1 in FIG. 1;

Figure 3:
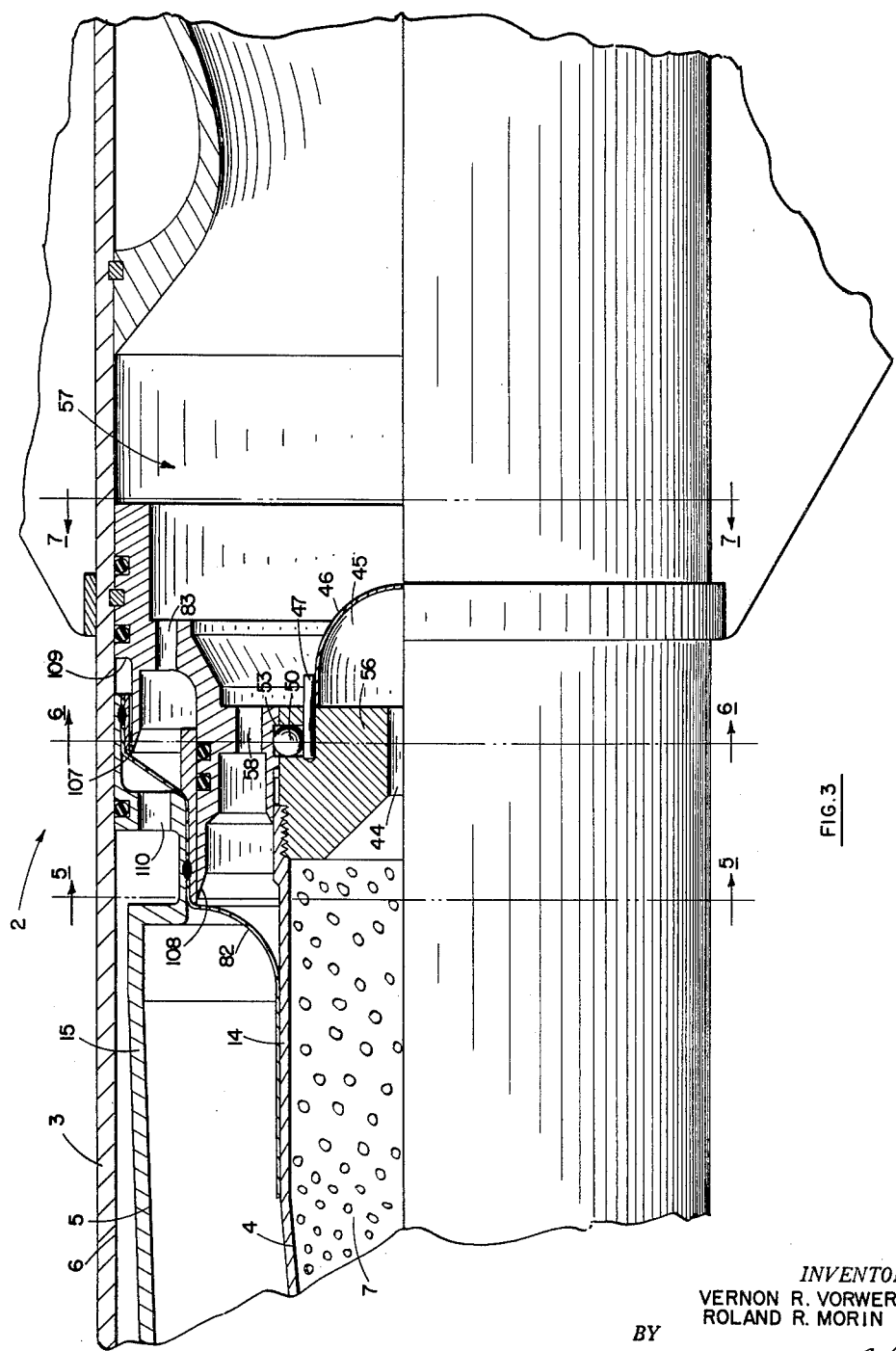
FIG. 3 is a quarter-section view of the cutting mechanism for releasing liquid propellants into the combustion chamber, indicated generally at 2 in FIG. 1.

Referring to the drawings, and in particular to FIG. 1, there is shown rocket case 3 within which are encased mechanism 1 and mechanism 2. Mechanism 1 is shown in FIGS. 2 and 4, while mechanism 2 is shown in FIGS. 3, 5, 6, and 7.

Figure 4:
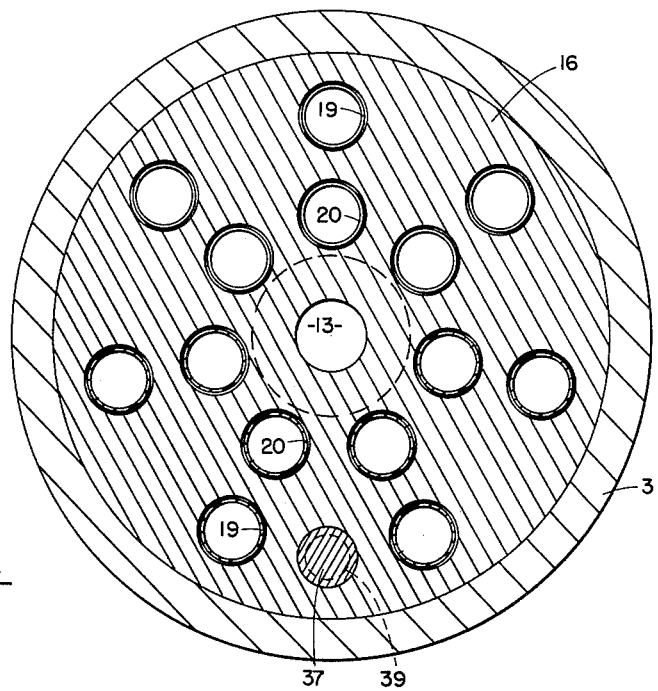
FIG. 4 is a section view of the device of this invention, taken at 4—4 in FIG. 2.
Figure 5:
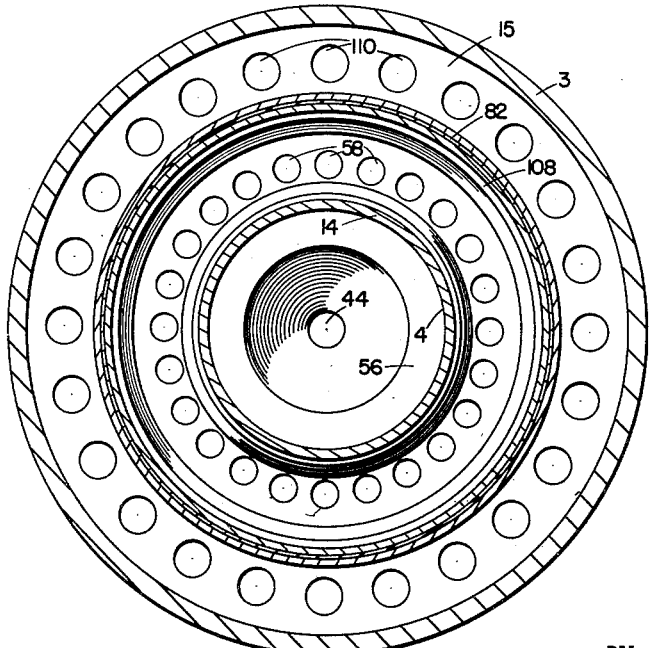
FIG. 5 is a section view of this invention, taken at 5—5 in FIG. 3.
Figure 6:
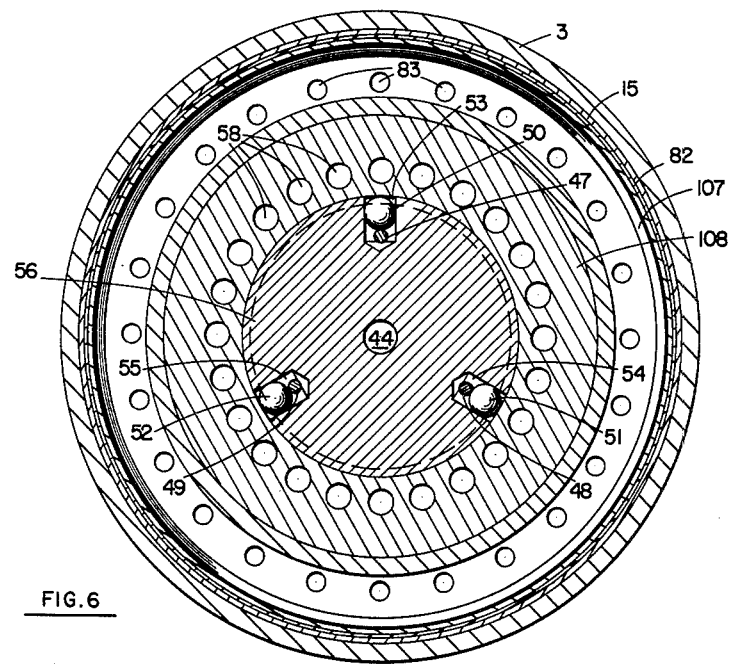
FIG. 6 is a section view of this invention, taken at 6—6 in FIG. 3.
Figure 7:
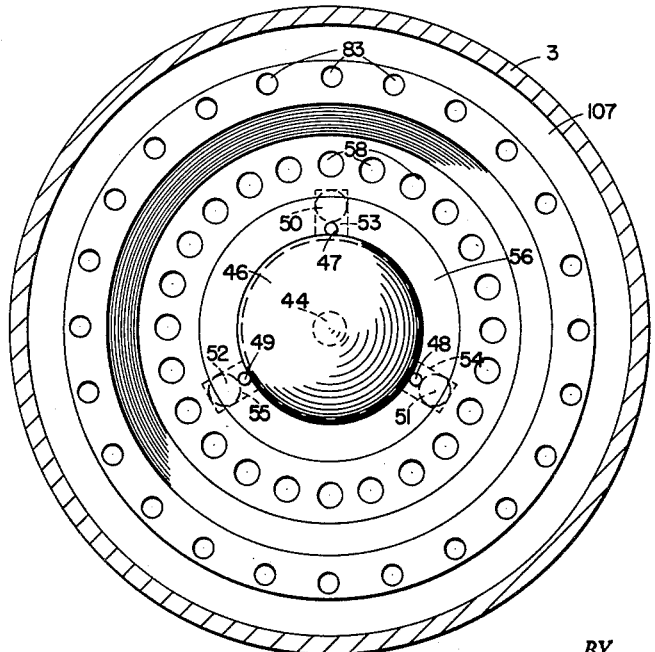
FIG. 7 is a section view of this invention, taken at 7—7 in FIG. 3.

In FIGS. 2 and 3, the internal portion of rocket case 3 is divided into major compartments 4, 5, and 6, of which compartment 4 contains solid grain powder and compartments or tanks 5 and 6 each contain one of the liquid propellants. Compartment 4 contains both powder 7 and squib 8. Squib 8 is connected to the outside of rocket case 3 by means of wires 9 where it is connected to voltage source 10 through switch 11. Chamber 4 opens into piston chamber 12 through nozzle 13. Wall 14 is connected to wall 15 and block 16. The combination of walls 14 and 15 and block 16 is slidingly movable in an axial direction of case 3. Ring 17 is a stop for the sliding movement of members 14, 15, and 16. Piston 18 and the series of cutters 19 and 20 are slidingly movable with respect to elements 14, 15, and 16 in an axial direction of case 3. Shoulders 33—36 act as stops for the movement of elements 18, 19, and 20. Shear disc 37 is attached to member 16 to prevent member 18 from sliding with respect to member 16 until pressure is introduced into piston chamber 12. Socket 38 is shaped to receive stud 39 when shear disc 37 is sheared. Diaphragms 40 and 41 block passages 42 and 43 until knives 19 and 20 puncture them. Nozzle 44 opens into hemispherical chamber 45. Hemisphere 46 is attached to pins 47, 48, and 49, shown more particularly in FIGS. 6 and 7. Balls 50, 51, and 52, shown more particularly in FIG. 6, rests upon pins 47, 48, and 49, respectively, and normally fit into notches 53, 54, and 55 when pins 47, 48, and 49 are engaged in block 56. Propellant chamber 5 is connected to firing chamber 57 by means of a series of holes 58 which are blocked by diaphragm 82 before firing, as shown more particularly in FIGS. 5, 6, and 7. Propellant chamber 6 is connected to firing chamber 57 by a series of holes 83 and 110, as shown more particularly in FIGS. 5, 6, and 7. Diaphragm 82 is between holes 83 and holes 110 before firing. Diaphragm 82 is rigidly attached to elements 14 and 15, as shown more particularly in FIGS. 5 and 6 by means of welds. Cutters 107 and 108 are attached to case 3. When elements 14 and 15 slide toward firing chamber 57 they are stopped by shoulder 109.

In operation, either solid propellant 7 is ignited by squib 8, or a compressed gas stored within chamber 4 is suddenly released by a valve (not shown) whereby pressure builds up within hemispherical chamber 45 and within piston chamber 12. Hemisphere 46 is blown into combustion chamber 57 and thence exhausted into the atmosphere. Because pins 47, 48, and 49 are connected to hemisphere 46 they are extracted from block 56, thereby releasing balls 50, 51, and 52 allowing them to be disengaged from notches 53, 54, and 55. The build-up of pressure within piston chamber 12 pushes slidable member 18 against shear disc 37 causing it to break. When shear disc 37 breaks, member 18 and knives 19 and 20 are moved by the pneumatic pressure within chamber 12. Knives 19 and 20 puncture the diaphragm discs 40 and 41 of diaphragm sealed pressurizing ports or passages 42 and 43, thereby allowing pneumatic pressure to enter propellant tanks 5 and 6. Stud 39 passes into socket 38 and member 18 is forced solidly against shoulder 33. When member 18 engages shoulder 33, the pneumatic pressure within chamber 12 causes the entire assembly of members 14, 15, 16, 18, 19, and 20, and diaphragm 82 to move axially until they are stopped by ring 17 and shoulder 109. The movement of diaphragm 82 in an axial direction causes diaphragm 82 to impinge upon knives 107 and 108 thereby creating an opening between tanks 5 and 6 and combustion chamber 57. The pneumatic pressure which was introduced into tanks 5 and 6 forces the propellants within tanks 5 and 6 through holes 58, 83, and 110 into combustion chamber 57. The propellants are then ignited by the hot gases, caused by the burning solid grain powder 7, which pass through nozzle 44 into combustion chamber 57.

Thus, the device of this invention provides a positive, simultaneous release of liquid propellant into a combustion chamber of a rocket whereby none of the propellants are wasted, the propellants are mixed with the proper ratio, and the racket is given its maximum efficiency and dependability.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a rocket having a rearward combustion chamber, a quick acting propellant release mechanism comprising a first, second, and third chamber, said first chamber containing means for generating pneumatic pressure, said second and third chambers containing liquid propellants, a plurality of openings between the rear of said second and third chambers and said combustion chamber of said rocket, rear diaphragms connected across each of said openings, interconnected first knife means adjacent each of said diaphragms, diaphragm sealed pressurizing ports at the forward end of said second and third chambers, interconnected second knife means adjacent each of said ports, movable piston means pneumatically connected to said means for generating pneumatic pressure and mechanically connected to said second knife means to cause said second knife means to engage said diaphragm sealed ports upon movement of said piston means, means for starting said pneumatic pressure generating means to create gases against said piston means and means including said movable piston means to force each of said rear diaphragms and each of said first knife means and each of said second knife means and said diaphragm sealed ports into engagement whereby said rear diaphragms are affirmatively punctured, said diaphragm sealed ports are opened, and any propellants which are contained in said second and third chambers are forced out through the openings created by the said punctured rear diaphragms into said combustion chamber of said rocket.

2. A device as recited in claim 1 in which said means for creating a pneumatic pressure is a solid-grained powder within said first chamber, and said means for releasing said pneumatic pressure is a squib within said first chamber.

3. A device as recited in claim 1 in which said first knife means are stationary, and said rear diaphragms are thrust against said first knife means by the movement of said piston in response to said released pneumatic pressure.

4. A quick-acting liquid propellant release mechanism comprising an outer cylindrical case having a first and second end, said first end of said outer case being closed; a first and second inner case, each having a first and second end, circularly symmetrical about the axis of said outer case enclosed within said outer case; said inner cases being shorter than said outer case; said first inner case being radially smaller than said second inner case; a piston chamber between said first ends of said inner cases and said first end of said outer case; nozzle means between the interior of said first inner case and said piston chamber; hole means between said piston chamber and the space between said first and second inner case; hole means between said piston chamber and the space between said second inner case and said outer case; diaphragms connected across said hole means to close them; first knife means adjacent said diaphragms; piston means connected to said knife means; said inner cases being slidingly movable in an axial direction of said outer case; a release mechanism attached to said second end of said first inner case; diaphragm means connected across the openings between said first and second inner case and between said second inner case and said outer case at said second ends of said inner cases; second knife means connected to said outer case adjacent said diaphragm means; nozzle means between the interior of said first inner case and said release mechanism; solid-grained powder and a squib within said first inner case; the space between said first and second inner case containing one propellant; the space between said second inner case and said outer case containing a second propellant; whereby when said squib is detonated said solid-grained powder is ignited and creates a pneumatic pressure which actuates said release mechanism and introduces pneumatic pressure into said piston chamber causing said first knife means to engage said first-mentioned diaphragms and said inner cases to slide so that said second knife means penetrates said second-mentioned diaphragm means and releasese said propellants, pneumatic pressure passing through said first-named diaphragms forcing said propellants out of said spaces between said cases.

5. A device as recited in claim 4 in which said release mechanism is a hemispherical chamber having a plurality of pins attached to its periphery, said pins penetrating into said first inner case, a plurality of balls equal in number to said pins, each said pin supporting a separate said ball, a plurality of sockets equal in number to said pins and said balls connected to said outer case, each said ball engaging a different said socket whereby when said pneumatic pressure is released, said hemispherical chamber and said pins are blown free and said balls drop out of said sockets thereby disengaging said inner cases from said outer case so that said inner cases are free to slide with respect thereto.

6. A quick-acting liquid propellant release mechanism for a rocket having a rear combustion chamber comprising a plurality of liquid propellant tanks within said rocket, each said propellant tank having a rear opening into said combustion chamber, each said opening being closed by a diaphragm, a plurality of rear knives equal in number to said diaphragms, each said knife being adjacent a different one of said diaphragms, injector means connected to said knives, piston means connected forward of said diaphragms for moving said diaphragms toward said knives in response to a pneumatic pressure, diaphragm sealed pressurizing ports at forward ends of said tanks, cutters attached to said piston means juxtaposed to said ports, means for generating a pneumatic pressure against said piston means to cause said diaphragms to engage and be punctured by said knives and to cause said cutters to open said ports thereby releasing liquid propellants from said tanks into said combustion chamber.

7. In a liquid fuel rocket propulsion system, the combination comprising a fluid-tight propellant container, cutter means normally spaced from said container, said container and cutter means being relatively movable into contact with each other whereby the cutter means will be forced through the wall of the container to effect the release of the propellant therefrom, one wall of said container defining a chamber, gas generating means in said chamber for effecting said relative movement, and means for normally retaining said container and cutter means in spaced relation, said last mentioned means including a movable detent, a pin normally holding said detent in its locking position, and a cap fixed to said pin and overlying a gas escape port of said chamber whereby gas generated by said gas generating means will act on said cap to effect the withdrawal of said pin and thereby permit the movement of said detent means to its unlocked position.

References Cited in the file of this patent

UNITED STATES PATENTS

| | | |
|---|---|---|
| 1,933,694 | Allen et al. | Nov. 7, 1933 |
| 2,398,201 | Young et al. | Apr. 9, 1946 |
| 2,402,826 | Lubbock | June 25, 1946 |
| 2,580,365 | Simmonds | Dec. 25, 1951 |
| 2,671,312 | Roy | Mar. 9, 1954 |
| 2,740,259 | Westlund | Apr. 3, 1956 |